(12) United States Patent
Sun

(10) Patent No.: US 9,604,443 B2
(45) Date of Patent: Mar. 28, 2017

(54) STRIPPING DEVICE AND METHOD

(71) Applicant: Boe Technology Group Co., Ltd., Beijing (CN)

(72) Inventor: Tao Sun, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/422,031

(22) PCT Filed: Aug. 8, 2014

(86) PCT No.: PCT/CN2014/083980
§ 371 (c)(1),
(2) Date: Feb. 17, 2015

(87) PCT Pub. No.: WO2015/120700
PCT Pub. Date: Aug. 20, 2015

(65) Prior Publication Data
US 2016/0023449 A1 Jan. 28, 2016

(30) Foreign Application Priority Data

Feb. 11, 2014 (CN) .......................... 2014 1 0047303

(51) Int. Cl.
*B32B 38/10* (2006.01)
*B32B 43/00* (2006.01)
*B32B 37/00* (2006.01)

(52) U.S. Cl.
CPC ........ *B32B 43/006* (2013.01); *B32B 37/0053* (2013.01); *B32B 38/10* (2013.01);
(Continued)

(58) Field of Classification Search
CPC . B32B 38/10; B32B 43/006; Y10T 156/1168; Y10T 156/1174; Y10T 156/195; Y10T 156/1956; Y10T 156/1978
(Continued)

(56) References Cited

U.S. PATENT DOCUMENTS 5,891,297 A * 4/1999 Stadtmueller ....... B29C 63/0013
156/715
7,677,289 B2 3/2010 Hayworth et al.
(Continued)

FOREIGN PATENT DOCUMENTS

| CN | 101310974 | 11/2008 |
| CN | 101827700 | 9/2010 |
| CN | 103786417 | 5/2014 |

OTHER PUBLICATIONS

International Search Report and Written Opinion from PCT/CN2014/083980 dated Nov. 19, 2014.
(Continued)

*Primary Examiner* — Mark A Osele
*Assistant Examiner* — Nickolas Harm
(74) *Attorney, Agent, or Firm* — Calfee, Halter & Griswold LLP

(57) ABSTRACT

A stripping device and method for stripping a plastic film from a glass substrate are provided. The stripping device includes a roller and a support member. The support member is disposed at a position where the plastic film is separated from the glass substrate. The support member supports and/or stretches the stripped plastic film. The roller is used to roll up the plastic film supported and/or stretched by the support member. Because the support member stretches and/or supports the plastic film as it is removed from the glass substrate, the plastic film is bent at a rounded angle. This reduces the stress generated in the plastic film during bending, thereby decreasing cracks in the plastic film and improving the overall useable yield of the plastic film.

17 Claims, 4 Drawing Sheets

(52) U.S. Cl.
CPC ....... *B32B 2315/08* (2013.01); *B32B 2457/20* (2013.01); *Y10T 156/1168* (2015.01); *Y10T 156/1174* (2015.01); *Y10T 156/195* (2015.01); *Y10T 156/1956* (2015.01); *Y10T 156/1978* (2015.01)

(58) Field of Classification Search
USPC ........................ 156/714, 715, 759, 760, 764
See application file for complete search history.

(56) References Cited

U.S. PATENT DOCUMENTS

| | | | | |
|---|---|---|---|---|
| 2002/0092611 | A1* | 7/2002 | Anderson | B29C 63/0013 156/289 |
| 2011/0155328 | A1* | 6/2011 | Kobayashi | H01L 21/67132 156/702 |
| 2013/0048223 | A1* | 2/2013 | Ahn | B32B 38/10 156/718 |
| 2013/0133835 | A1* | 5/2013 | Lee | H01L 51/56 156/379.6 |

OTHER PUBLICATIONS

Office action from Chinese Application No. 201410047303.9 dated Aug. 6, 2015.
Office action from Chinese Application No. 201410047303.9 dated Jun. 18, 2015.

\* cited by examiner

STRIPPING DEVICE AND METHOD

RELATED APPLICATIONS

The present application is the U.S. national stage entry of International Application No. PCT/CN2014/083980 filed Aug. 8, 2014, which claims priority to and the benefit of Chinese Patent Application No. 201410047303.9 filed Feb. 11, 2014, the entire disclosures of which are incorporated herein by reference in their entirety.

FIELD

The present invention relates to the technical field of displays, and, in particular, to a stripping device and method.

BACKGROUND

Traditional display technology relates to glass plate displays which cannot be bent at will. It is a trend for display technology in the future that displaying a massive amount of information on a flexible body, i.e., a flexible display, is desired. Current display techniques capable of achieving flexible display include LCD (Liquid Crystal Display), OLED (Organic Light-emitting Diode), EPD (Electronic Paper Display), PDLC (Polymer Dispersed Liquid Crystal), and CHLC (Cholesteric Liquid Crystal) modes. The underlying substrates mainly include ultra-thin glass, metal foils, and plastics.

Ultra-thin glass substrates boast good vapor and oxygen obstructing properties and excellent transparency, but they are sensitive to crack defects and hence have a poor performance in terms of impact resistance and bending properties. Therefore, it is difficult to perform a roll-to-roll process to develop ultra-thin bendable glass.

Being resistant to a high temperature and being low in cost, metal foil substrates have the function of obstructing vapor and oxygen. As the metal foil substrates per se exhibit good ductility, it is easy to perform a roll-to-roll process. However, due to a comparatively large surface roughness of the foils (Ra=0.6 μm), it is still necessary to plate a planarization layer after polishing, which increases the thickness of the device and, in turn, exerts an adverse influence on characteristics of the associated TFT (Thin Film Transistor).

Plastic substrates are very promising materials for flexible displays with better flexibility, a lighter weight, and better impact resistance. In the fabrication process, plastic is usually attached to a glass substrate, which is then subjected to operations such as array process, organic EL (electroluminescent) evaporation process, encapsulation, and IC bonding. Then, the plastic is stripped from the glass substrate. A conventional mechanical stripping method is shown in FIG. 1. In this method, a plastic film 2 is removed (i.e., wound off) by a roller 1. Since there is an adhesion layer which has a certain bonding force at the contact interface between the plastic material and a glass substrate 3, small gaps may turn up between the plastic film 2 and the lower surface of the roller 1 during winding, and consequently the plastic will be bent at a small angle, resulting in micro-cracks in the layered structure on the upper surface of the plastic film, which could influence the performance of the device, lead to a separation between layers, or possibly even a failure of the device.

SUMMARY

In one exemplary embodiment of the present invention, a stripping device and method are provided. The stripping device and the method are capable of reducing micro-cracks developed in a plastic film during stripping and improving the yield of the plastic film.

In one exemplary embodiment of the present invention, a stripping device for stripping the plastic film from a glass substrate is provided. The stripping device comprises a first roller and a first support member, wherein the first support member is disposed at a position where the plastic film is separated from the glass substrate, for at least one of supporting and stretching the stripped plastic film, and wherein the first roller is used for rolling up the plastic film supported and/or stretched by the first support member.

Preferably, but not necessarily, the first support member has a curved outer surface for supporting and/or stretching the stripped plastic film.

Preferably, but not necessarily, the first support member is a second roller, which has an axis parallel with that of the first roller and has a round roll surface for supporting and/or stretching the stripped plastic film.

Preferably, but not necessarily, the second roller has a diameter smaller than that of the first roller.

Preferably, but not necessarily, the first roller has a column length equal to that of the second roller.

Preferably, but not necessarily, the stripping device further comprises a connecting rod, and one end of the connecting rod is connected to a roller axial end of the first roller and the other end is connected to the first support member, for fixing the relative position between the first roller and the first support member.

Preferably, but not necessarily, there are two connecting rods, which are located at both sides of the first roller and the first support member, respectively, for connecting the first roller and the first support member with each other at either side.

Preferably, but not necessarily, the roll surface of the first roller is not in contact with the first support member.

Preferably, but not necessarily, the stripping device further comprises a second support member which is connected with the first support member and the first roller, respectively, via connecting rods.

In one exemplary embodiment of the present invention, a stripping method for stripping the plastic film from the glass substrate using the stripping device as described above is provided. The stripping method comprises:

Step S1, stripping, from the glass substrate, an edge section of the plastic film to be stripped off;

Step S2, disposing the first roller and the first support member on the glass substrate and winding the plastic film that has been stripped around the first support member;

Step S3, fixing the plastic film that has been wound around the first support member onto the first roller; and Step S4, rotating the first roller to strip off the plastic film.

In one exemplary embodiment of the present stripping device, the first support member for at least one of supporting and stretching the plastic film to be stripped off is disposed at a position where the plastic film is separated from the glass substrate. The first support member has a function of stretching and/or supporting the plastic film prior to stripping off the plastic film. As a result, the angle due to bending when the plastic film is stripped from the glass substrate is a rounded angle, which reduces the stress generated in the plastic film during bending, thereby decreasing cracks in the plastic film and improving the yield of the plastic film.

DETAILED DESCRIPTION

Various representative embodiments of the present invention are further described below with reference to the figures. The following embodiments are only meant for more clearly explaining the general inventive concepts and are not intended to limit the overall scope of the present invention.

Embodiment I

Figure 2:
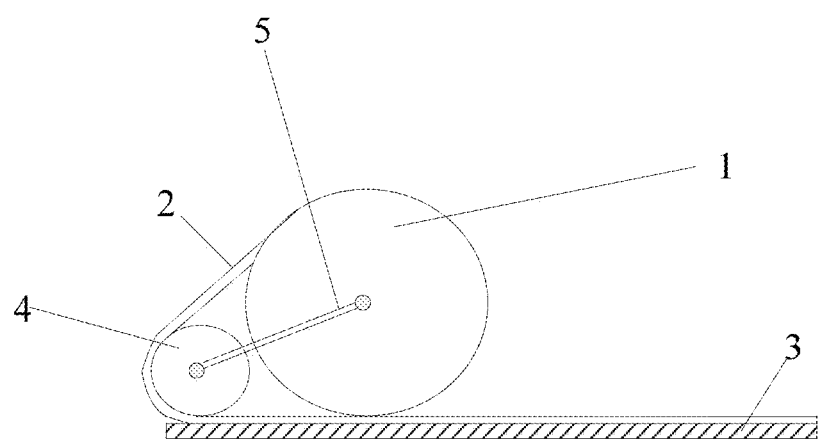
FIG. 2 is a schematic structural view of a stripping device, according to an exemplary embodiment of the present invention.

In a first exemplary embodiment of the present invention, a stripping device for stripping a plastic film from a glass substrate is provided. As shown in FIG. 2, the stripping device comprises a first roller 1 and a first support member 4.

Figure 1:
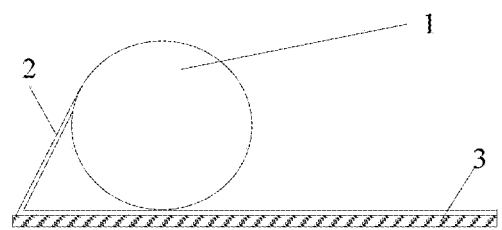
FIG. 1 is a schematic structural view of a conventional stripping device.

The first support member 4 is disposed at a position where the plastic film 2 is separated from the glass substrate 3. For example, the first support member 4 is disposed closer to the position where the plastic film 2 is separated from the glass substrate 3 than the conventional stripping device of FIG. 1. The first support member 4 supports and/or stretches the stripped plastic film 2. The first roller 1 is used for rolling up the plastic film 2 supported and/or stretched by the first support member 4.

As can be seen in FIG. 2, because of the supporting and/or stretching function of the first support member 4, the angle at which the plastic film 2 is bent during stripping is a rounded angle or a large bending angle. For example, the bending angle is larger than the bending angle created by the conventional stripping device of FIG. 1. Thus, fewer, if any, micro-cracks will be developed in the plastic film 2 due to an excessively sharp bending angle, and the overall useable yield of the plastic film 2 will be improved.

Preferably, but not necessarily, the first support member 4 has a curved outer surface for supporting and/or stretching the stripped plastic film 2. In this way, the angle at which the plastic film 2 is bent is made smoother (i.e., less sharp) so as to better avoid micro-cracks in the plastic film 2 during stripping.

It is noted that the exemplary embodiments of the present invention, as shown and described herein, should not be understood as limiting the scope of the present invention. In practical applications, instead of the curved surface, the first support member may have a polygon with obtuse inner angles (e.g., a regular hexagon or a dodecagon), which can also avoid an excessively sharp angle formed by the plastic film and thus avoid causing micro-cracks therein.

Preferably, but not necessarily, as shown in FIG. 2, the first support member 4 is a second roller which has an axis parallel with that of the first roller 1 and has a round roll surface for supporting and/or stretching the stripped plastic film 2.

By using a roller as the first support member, it is possible to reduce friction between the plastic film 2 and the first support member, thereby avoiding scratches on the plastic film 2.

Preferably, but not necessarily, as shown in FIG. 2, the second roller has a diameter smaller than that of the first roller 1.

On the premise that micro-cracks in a layered structure on the plastic film are avoided, the diameter of the second roller is set smaller than that of the first roller 1, which can reduce the weight of the second roller 4 and decrease difficulty in stripping.

Preferably, but not necessarily, the first roller 1 has a column length equal to that of the second roller. This is more beneficial in terms of structural stability of the entire stripping device.

Preferably, but not necessarily, a connecting rod 5 can be further arranged, as shown in FIG. 2. One end of the connecting rod 5 is connected to the roller axial end of the first roller 1, and the other end of connecting rod 5 is connected to the first support member 4, for fixing the relative position between the first roller 1 and the first support member 4.

In this way, due to the supporting and/or stretching function of the first roller 1 with respect to the first support member 4, even if the first support member 4 has a lighter weight, it will not tilt and will always be located at a position where the plastic film 2 is stripped from the glass substrate 3. In practical applications, this facilitates downsizing the first support member 4 and thus reducing cost for manufacturing the first support member 4.

When the first support member 4 is the second roller, a recess (or hole) can be arranged on both ends of the connecting rod 5, respectively, a protrusion along the axis direction is arranged at the circle centers of the cross-sections at the same end of the two rollers, respectively, and the protrusions are engaged with the recesses (or holes). Alternatively, a protrusion perpendicular to the connecting rod 5 is arranged at both ends of the connecting rod 5, respectively, a recess is arranged at the circle centers of the cross-sections at the same end of the two rollers, respectively, and the protrusions of the connecting rod are inserted into the corresponding recesses.

Preferably, but not necessarily, there can be two such connecting rods 5, which are located at both sides of the first roller 1 and the first support member 4, respectively, for connecting the first roller 1 and the first support member 4 with each other at either side. When the first support member 4 is the second roller, the roller axial ends on the same sides of the first roller and the second roller can be connected in pairs.

The manner in which the first and second rollers are connected is consistent with the case in which they are connected at one end, and explanations for this shall not be given here. This is more beneficial for maintaining the relative position of the two rollers.

Preferably, but not necessarily, the roll surface of the first roller 1 is not in contact with the first support member 4.

Embodiment II

Figure 3:
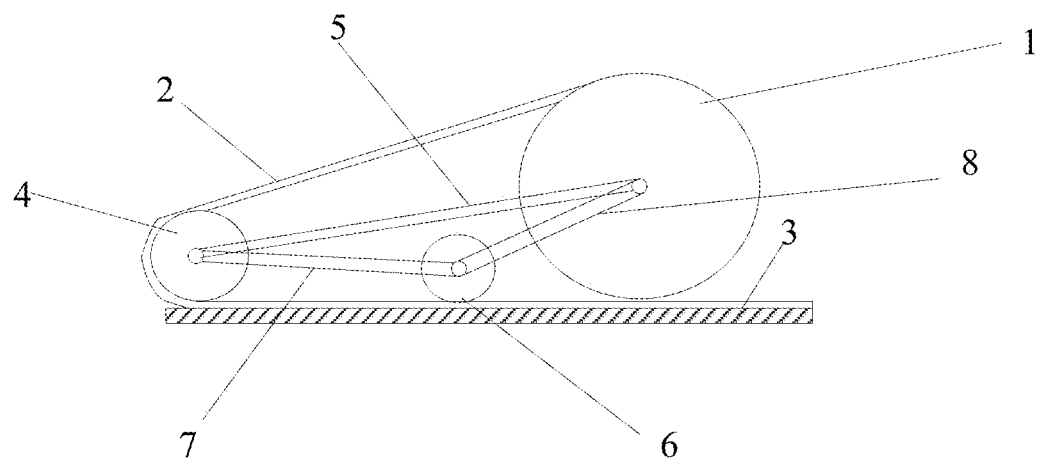
FIG. 3 is a schematic structural view of a stripping device, according to an exemplary embodiment of the present invention.

In a second exemplary embodiment of the present invention, a stripping device, as shown in FIG. 3, differs from the stripping device of the first exemplary embodiment in that it further comprises a second support member 6. The second support member 6 is connected with the first support member 4 via a connecting rod 7 and with the first roller 1 via a connecting rod 8. The first support member 4, the second support member 6, and the first roller 1 are connected by connecting rods 5, 7, 8 to form a stable triangular structure.

In this way, the first support member 4 will not to be raised by the plastic film 2 while stripping off the plastic film 2.

Correspondingly, as shown in FIG. 3, the second support member 6 can also be a roller (e.g., a third roller), and the manner in which the second support member 6 is connected with the first roller 1 and the first support member 4 can be consistent with the manner in which the first roller 1 is connected with the second roller, and no further detailed explanation is believed necessary.

Figure 4:
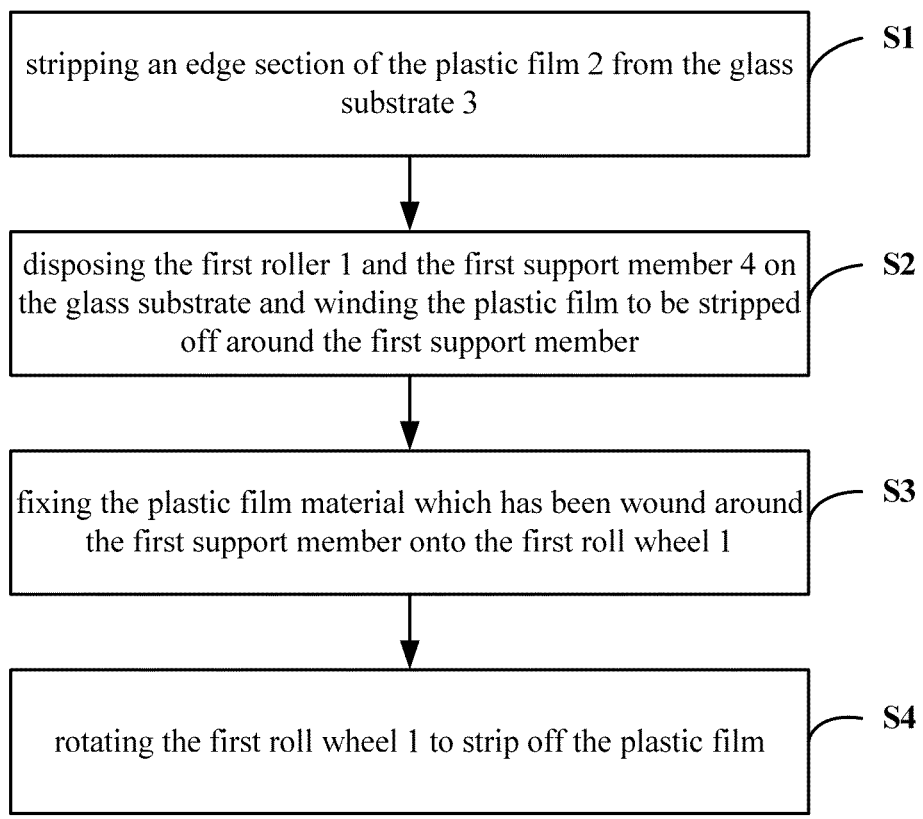
FIG. 4 is a schematic flow chart of a stripping method, according to an exemplary embodiment of the present invention.

Based on the same general inventive concept, the present invention further provides a stripping method for stripping a plastic film from a glass substrate using the stripping device as described above. With reference to FIGS. 2 and 4, a stripping method, according to an exemplary embodiment of the present invention, will be described hereinafter by taking a case in which the first support member is the second roller as an example. The stripping method comprises the following steps. One or more of the steps could be implemented as a manual or automated step.

Step S1, stripping, from the glass substrate 3, an edge section of the plastic film 2 to be stripped off.

In practical applications, the plastic film 2 can be stripped from the glass substrate 3 from one end by using a thin blade.

Step S2, disposing the first roller 1 and the second roller on the glass substrate and winding the stripped plastic film 2 around the second roller such that a part of the outer surface of the first support member 4 is enveloped by the plastic film 2.

Step S3, fixing the plastic film which has been wound around the second roller onto the first roller 1.

For example, the portion of the plastic film 2 that has been stripped off is wound around the second roller and then stuck to the first roller 1 using an adhesive tape or any other means suitable for securely attaching the plastic film 2 to the first roller 1.

Step S4, rotating the first roller 1 to strip off the plastic film.

With reference to FIG. 2, in step S4, the first roller 1 rolls towards the right on the glass substrate and drives the second roller to roll towards the right. Due to the supporting and/or stretching function of the second roller, when the plastic film 2 is bent towards an opposite direction after being stripped from the glass substrate 3, the angle due to bending is a rounded angle. In this way, micro-cracks in the plastic film 2 can be avoided, or otherwise reduced, and the overall useful yield of the plastic film 2 can be improved.

Those skilled in the art shall understand that when the above stripping device further comprises a second support member (e.g., the second support member 6), it may also be necessary to wind the plastic film 2 around the second support member, and the situation of the use can otherwise be similar to that shown in FIG. 2.

The above contents are only exemplary embodiments of the present invention, and it should be pointed out that for those having ordinary skills in the art, several improvements and modifications can also be made on the premise of not diverging from the technical principles of the present invention, and all such improvements and modifications should also be deemed as falling within the scope of the general inventive concepts. For example, the number of the rollers or support members is not limited by two or three as described in the present application, but instead, any number of rollers or support members could be utilized.

The invention claimed is:

1. A stripping device for stripping a plastic film from a glass substrate, the stripping device comprising:
   a first roller;
   a first support member; and
   a second support member,
   wherein the first roller and the first support member are connected to one another,
   wherein the first support member is operable to be disposed at a position where the plastic film is separated from the glass substrate to at least one of support and stretch the stripped plastic film,
   wherein the first roller is operable to roll up the plastic film being at least one of supported and stretched by the first support member, and
   wherein the first roller, the first support member, and the second support member are disposed on the glass substrate, and are connected with one another at by a first, second, and third connecting rod to form a triangular structure.

2. The stripping device according to claim 1, wherein the first support member has a curved outer surface.

3. The stripping device according to claim 2, wherein the first support member is a second roller,
   wherein the second roller has an axis parallel with that of the first roller, and
   wherein the second roller has a round roll surface for at least one of supporting and stretching the stripped plastic film.

4. The stripping device according to claim 3, wherein the second roller has a diameter smaller than that of the first roller.

5. The stripping device according to claim 4,
   wherein one end of the first connecting rod is connected to a roller axial end of the first roller and the other end of the first connecting rod is connected to the first support member, and
   the first connecting rod fixes the relative position between the first roller and the first support member;
   wherein one end of the second connecting rod is connected to the first support member and the other end of the second connecting rod is connected to the second support member, and the second connecting rod fixes the relative position between the first support member and the second support member; and
   wherein one end of the third connecting rod is connected to the second support member and the other end of the third connecting rod is connected to the roller axial end of the first roller, and the third connecting rod fixes the relative position between the second support member and the first roller.

6. The stripping device according to claim 4, comprising two groups of the first, second, and third connecting rods, which are located at both sides of the first roller, the first support member, and the second support member, respectively, for connecting the first roller, the first support member, and the second support member with one another at either side.

7. The stripping device according to claim 3, wherein the first roller has a column length equal to that of the second roller.

8. The stripping device according to claim 7,
   wherein one end of the first connecting rod is connected to a roller axial end of the first roller and the other end of the first connecting rod is connected to the first support member, and
   the first connecting rod fixes the relative position between the first roller and the first support member;
   wherein one end of the second connecting rod is connected to the first support member and the other end of the second connecting rod is connected to the second support member, and the second connecting rod fixes the relative position between the first support member and the second support member; and wherein one end of the third connecting rod is connected to the second support member and the other end of the third connecting rod is connected to the roller axial end of the first roller, and the third connecting rod fixes the relative position between the second support member and the first roller.

9. The stripping device according to claim 7, comprising two groups of the first, second, and third connecting rod, which are located at both sides of the first roller, the first support member, and the second support member, respectively, for connecting the first roller, the first support member, and the second support member with one another at either side.

10. The stripping device according to claim 3,
wherein one end of the first connecting rod is connected to a roller axial end of the first roller and the other end of the first connecting rod is connected to the first support member, and
the first connecting rod fixes the relative position between the first roller and the first support member;
wherein one end of the second connecting rod is connected to the first support member and the other end of the second connecting rod is connected to the second support member, and the second connecting rod fixes the relative position between the first support member and the second support member; and
wherein one end of the third connecting rod is connected to the second support member and the other end of the third connecting rod is connected to the roller axial end of the first roller, and the third connecting rod fixes the relative position between the second support member and the first roller.

11. The stripping device according to claim 3, comprising two groups of the first, second, and third connecting rods, which are located at both sides of the first roller, the first support member, and the second support member, respectively, for connecting the first roller, the first support member, and the second support member with one another at either side.

12. The stripping device according to claim 2,
wherein one end of the first connecting rod is connected to a roller axial end of the first roller and the other end of the first connecting rod is connected to the first support member, and
the first connecting rod fixes the relative position between the first roller and the first support member;
wherein one end of the second connecting rod is connected to the first support member and the other end of the second connecting rod is connected to the second support member, and the second connecting rod fixes the relative position between the first support member and the second support member; and wherein one end of the third connecting rod is connected to the second support member and the other end of the third connecting rod is connected to the roller axial end of the first roller, and the third connecting rod fixes the relative position between the second support member and the first roller.

13. The stripping device according to claim 2, comprising two groups of the first, second, and third connecting rods, which are located at both sides of the first roller, the first support member, and the second support member, respectively, for connecting the first roller, the first support member, and the second support member with one another at either side.

14. The stripping device according to claim 1,
wherein one end of the first connecting rod is connected to a roller axial end of the first roller and the other end of the first connecting rod is connected to the first support member, and
the first connecting rod fixes the relative position between the first roller and the first support member;
wherein one end of the second connecting rod is connected to the first support member and the other end of the second connecting rod is connected to the second support member, and the second connecting rod fixes the relative position between the first support member and the second support member; and
wherein one end of the third connecting rod is connected to the second support member and the other end of the third connecting rod is connected to the roller axial end of the first roller, and the third connecting rod fixes the relative position between the second support member and the first roller.

15. The stripping device according to claim 1, comprising two groups of the first, second, and third connecting rod, which are located at both sides of the first roller, the first support member, and the second support member, respectively, for connecting the first roller, and the first support member, and the second support member with one another at either side.

16. The stripping device according to claim 1, wherein the roll surface of the first roller is not in contact with the first support member.

17. A method of stripping a plastic film from a glass substrate by using the stripping device of claim 1, the method comprising:
stripping from the glass substrate an edge section of the plastic film;
disposing the first roller, a first support member, and the second support member on the glass substrate and winding the plastic film which has been stripped off around the first support member;
fixing the plastic film which has been wound around the first support member onto the first roller; and
rotating the first roller to strip the plastic film from the glass substrate.

* * * * *